(12) United States Patent
Cohen et al.

(10) Patent No.: US 8,085,778 B1
(45) Date of Patent: *Dec. 27, 2011

(54) VOLTAGE REGULATOR

(75) Inventors: Yuval Cohen, Raanana (IL); Nafea Bishara, San Jose, CA (US); Michael Orr, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 17 days.

This patent is subject to a terminal disclaimer.

(21) Appl. No.: 12/581,512

(22) Filed: Oct. 19, 2009

Related U.S. Application Data

(63) Continuation of application No. 10/958,077, filed on Oct. 4, 2004, now Pat. No. 7,606,230.

(60) Provisional application No. 60/569,728, filed on May 10, 2004.

(51) Int. Cl.
*H04L 12/28* (2006.01)
(52) U.S. Cl. ........................ 370/392; 370/401
(58) Field of Classification Search .................. 370/238, 370/392, 401
See application file for complete search history.

(56) References Cited

U.S. PATENT DOCUMENTS

| | | | | |
|---|---|---|---|---|
| 6,038,600 | A * | 3/2000 | Faulk et al. | 709/224 |
| 6,058,116 | A | 5/2000 | Hiscock et al. | |
| 6,163,543 | A | 12/2000 | Chin et al. | |
| 6,363,077 | B1 | 3/2002 | Wong et al. | |
| 6,385,197 | B1 | 5/2002 | Sugihara | |
| 6,456,962 | B1 | 9/2002 | Allingham et al. | |
| 6,545,982 | B1 * | 4/2003 | Murthy et al. | 370/245 |
| 6,553,029 | B1 | 4/2003 | Alexander | |
| 6,567,410 | B1 | 5/2003 | Perlman | |
| 6,614,758 | B2 | 9/2003 | Wong et al. | |
| 6,687,751 | B1 | 2/2004 | Wils et al. | |
| 6,850,495 | B1 * | 2/2005 | Baum et al. | 370/256 |
| 6,857,027 | B1 | 2/2005 | Lindeborg et al. | |
| 6,956,824 | B2 | 10/2005 | Mark et al. | |
| 6,987,735 | B2 | 1/2006 | Basso et al. | |
| 7,463,654 | B2 | 12/2008 | Riegel et al. | |
| 2003/0021283 | A1 | 1/2003 | See et al. | |
| 2005/0041590 | A1 * | 2/2005 | Olakangil et al. | 370/238 |

OTHER PUBLICATIONS

IEEE Standard 802.20-PD-06, Draft 802.20 Permanent Document, System Requirements for IEEE 802.20 Mobile Broadband Wireless Access Systems—Version 14, Jul. 16, 2004, pp. 1-24.
802.16 IEEE Standard for Local and Metropolitan Area Networks; Part 16: Air Interface for Fixed Broadband Wireless Access Systems, 802.16 IEEE Standard for Local and Metropolitan Area Networks, Oct. 1, 2004, pp. i-xxxiv and pp. 1-857, IEEE Std. 802.16-2004, IEEE, United States.
Non-Final Office Action dated Oct. 31, 2007 for U.S. Appl. No. 10/958,077, filed Oct. 4, 2004.
Amendment dated Feb. 29, 2008 in response to Non-Final Office Action dated Oct. 31, 2007 for U.S. Appl. No. 10/958,077, filed Oct. 4, 2004.
Final Office Action dated Jun. 23, 2008 for U.S. Appl. No. 10/958,077, filed Oct. 4, 2004.
Amendment dated Sep. 23, 2008 in response to Final Office Action dated Jun. 23, 2008 for U.S. Appl. No. 10/958,077, filed Oct. 4, 2004.
Non-Final Office Action dated Dec. 17, 2008 for U.S. Appl. No. 10/958,077, filed Oct. 4, 2004.
Amendment dated Mar. 13, 2009 in response to Non-Final Office Action dated Dec. 17, 2008 for U.S. Appl. No. 10/958,077, filed Oct. 4, 2004.

* cited by examiner

*Primary Examiner* — Jung Park

(57) ABSTRACT

A network device includes a plurality of ports configured to transmit and receive packets of data. A memory is configured to store a routing table. A forwarding engine is configured to transfer the packets of data between the plurality of ports based on the routing table. A processor is configured to define a routing interface. The routing interface comprises a group of the plurality of ports. The processor is configured to assign a media access control (MAC) address to the routing interface. The processor is configured to modify the routing table to direct each packet of data having the media access control (MAC) address as a destination address to a port in the routing interface.

15 Claims, 2 Drawing Sheets

VOLTAGE REGULATOR

CROSS-REFERENCE TO RELATED APPLICATIONS

This application is a continuation of U.S. patent application Ser. No. 10/958,077, filed Oct. 4, 2004, now U.S. Pat. No. 7,606,230, which claims the benefit of U.S. Provisional Patent Application No. 60/569,728, filed May 10, 2004, the disclosures thereof incorporated by reference herein in their entirety.

BACKGROUND

The present invention relates generally to network communications. More particularly, the present invention relates to link aggregation in a network device.

The growing popularity of high-speed data communications has led to an increasing demand for high-bandwidth data channels that exceed the bandwidth of existing communication links. A solution that has enjoyed widespread acceptance is link aggregation, often referred to as "layer-2 trunking" or "trunking."

Link aggregation is a method of combining multiple physical data communication links to form a single logical link, thereby increasing the capacity and availability of the communication channels between network devices such as servers, switches, end stations, and other network-enabled devices. For example, two or more Gigabit Ethernet or Fast Ethernet connections between two network devices can be combined to increase bandwidth capability and to create resilient and redundant links.

Link aggregation also provides load balancing, which is especially important for networks where it is difficult to predict the volume of data directed to each network device. Link aggregation distributes processing and communications activity evenly across a network so that no single network device is overwhelmed.

Link aggregation is documented in the Institute of Electrical and Electronics Engineers (IEEE) standard 802.3ad, which is incorporated by reference herein in its entirety.

However, conventional network devices employ silicon mechanisms to provide link aggregation, and so are limited in the number of trunks they can provide. Furthermore, many conventional network devices do not permit link aggregation at all.

SUMMARY

In general, in one aspect, the invention features a wireless network apparatus and corresponding method and computer program. It comprises a plurality of ports to transmit and receive data flows comprising packets of data; a memory to store a routing table; a forwarding engine to transfer the packets of data between the ports according to the routing table; and a processor to define a routing interface comprising a selected group of the ports, map a selected media access control (MAC) address to the routing interface, disable link aggregation between the ports in the routing interface, disable bridging between the ports in the routing interface, and modify the routing table to direct each of the data flows having the MAC address as a destination address to one of the ports in the routing interface.

Particular implementations can include one or more of the following features. The processor modifies the routing table entries for the ports in the routing interface to provide load balancing among the ports in the routing interface. The load balancing is based on Equal Cost Multi-Path Routing Protocol (ECMP). To define a routing interface, the processor allocates a virtual local-area network (ULAN) to the selected group of the ports. A multi-layer switch comprises the network device.

The details of one or more implementations are set forth in the accompanying drawings and the description below. Other features will be apparent from the description and drawings, and from the claims.

Figure 1:
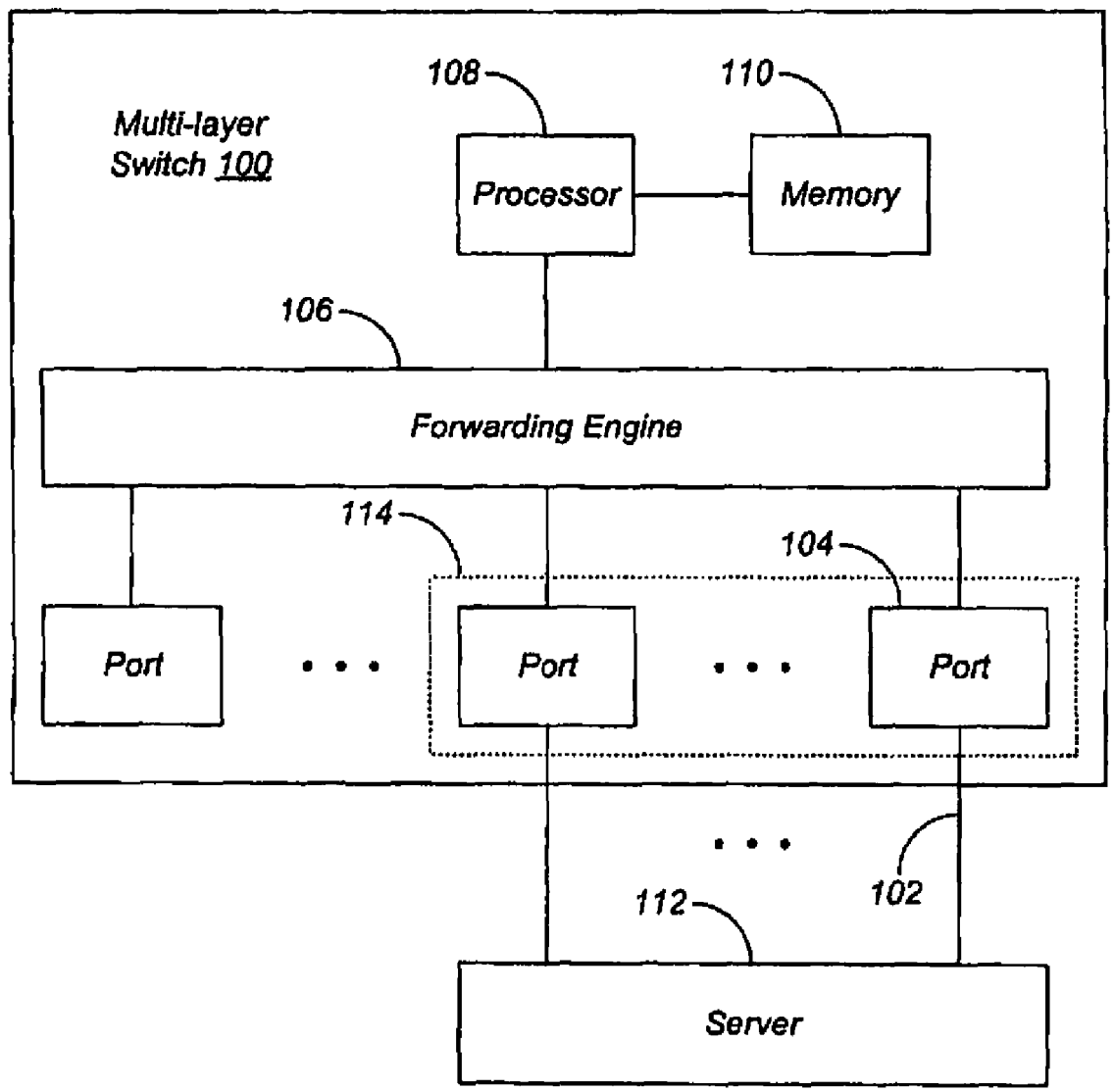
FIG. 1 shows a multi-layer switch in communication with a server over network links according to a preferred embodiment.

The leading digit(s) of each reference numeral used in this specification indicates the number of the drawing in which the reference numeral first appears.

DETAILED DESCRIPTION

Embodiments of the present invention employ routing techniques, for example in a multi-layer switch, to implement link aggregation without using conventional layer-2 link aggregation techniques, thereby creating what are referred to herein as "routed trunks." A significant advantage of these routed trunks is that the number of routed trunks a switch can employ is not restricted by any link aggregation limit of the switch. Large numbers of routed trunks are especially useful when communicating with a large number of servers, which often requires a number of trunks that exceeds the link aggregation limit of conventional switches.

Network devices employing the routed trunks of the present invention are compatible with existing networks such as the Internet. The techniques disclosed herein are internal to the device employing them, and are transparent to other devices which can, but need not, employ those techniques. Thus embodiments of the present invention have broad applicability.

FIG. 1 shows a multi-layer switch 100 in communication with a network device 112 such as a server over network links 102 according to a preferred embodiment. A multi-layer switch is a switch that combines aspects of data link layer switches and network-layer switches, as is well-known in the relevant arts. But although embodiments of the present invention are described with respect to a multilayer switch, these embodiments are applicable to other sorts of network devices such as routers and the like. In addition, although embodiments of the present invention are described as establishing routed trunks with a server, these embodiments are equally applicable in establishing routed trunks with other sorts of network devices such as network switches and the like.

Multi-layer switch 100 comprises a plurality of ports 104, a forwarding engine 106, a processor 108, and a memory 110. Ports 104 transmit and receive data flows comprising packets of data. A data flow is an ordered set of packets transmitted from one network device to another, as is well-known in the relevant arts. Forwarding engine 106 transfers the packets between ports 104 according to entries in routing tables stored in memory 110 according to techniques well-known in the relevant arts. Processor 108 creates and modifies the routing tables according to other well-known techniques such as learning.

Figure 2:
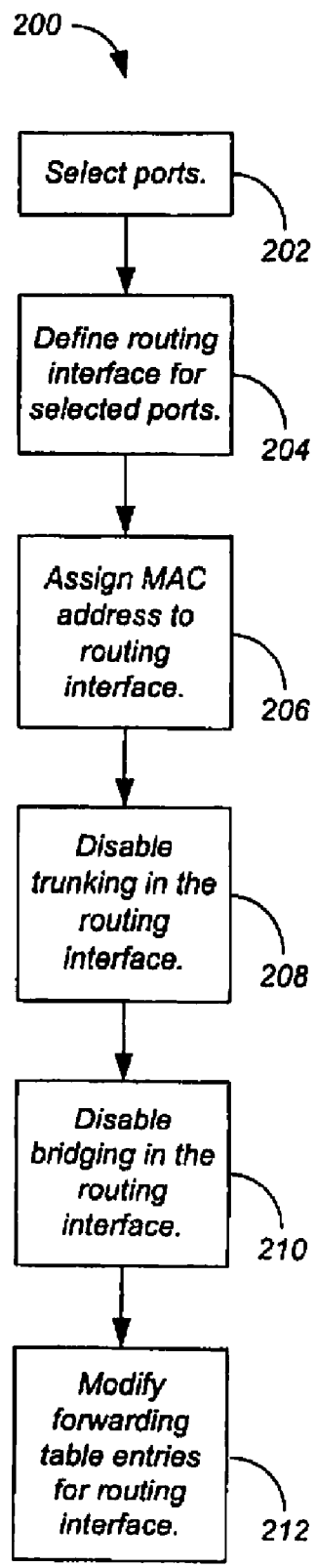
FIG. 2 shows a process for the multi-layer switch of FIG. 1 to establish a routed trunk with the server of FIG. 1 according to a preferred embodiment.

FIG. 2 shows a process 200 for multi-layer switch 100 to establish a routed trunk with server 112 according to a preferred embodiment. First a group 114 of the ports 104 that are in communication with server 112 is selected for routed link aggregation (step 202). The group 114 of ports 104 can be selected by the user manually or with the help of some automated process such as the link aggregation control protocol (LACP) documented in the Institute of Electrical and Electronics Engineers (IEEE) standard 802.3ad, which is incorporated by reference herein in its entirety.

Processor 108 then defines a routing interface comprising the selected group 114 of ports 104 according to techniques well-known in the relevant arts (step 204). In some embodiments, the routing interface is defined by allocating a virtual local area network (VLAN) to the selected group 114 of ports 104. VLANs are documented in the Institute of Electrical and Electronics Engineers (IEEE) standard 802.3q, which is incorporated by reference herein in its entirety.

Processor 108 assigns one of the media access control (MAC) addresses belonging to multi-layer switch 100 to the routing interface (step 206).

As mentioned above, the routed trunks of the present invention provide the benefits and appearance of conventional link aggregation without employing conventional trunking, thereby permitting more trunks that conventional switches allow. Therefore, to prevent multi-layer switch 100 from employing conventional layer-2 trunking, processor 108 disables layer-2 link aggregation between the ports 104 in the routing interface (step 208).

If bridging were enabled between the ports 104 in the selected group 114, traffic received from server 112 by one port 104 in the group 114 could be sent back to server 112 by one or more of the other ports 104 in the group 114. To prevent this problem, processor 108 disables bridging between the ports 104 in the routing interface (step 210).

As mentioned above, a data flow is an ordered set of packets transmitted from one network device to another. As long as the order of the packets in each data flow is preserved, a network switch can employ any mechanism for trunking. To ensure that the packet order is preserved, processor 108 modifies the routing table to direct each of the data flows having the routing interface's MAC address as a destination address to one of the ports 104 in the routing interface (step 212).

Processor 108 optionally modifies the routing table entries in memory 110 for the ports 104 in the routing interface to provide load balancing among the ports 104 in the routing interface. One well-known routing protocol that can be used for load balancing is the Equal Cost Multi-Path Routing Protocol (ECMP), which provides multiple routed paths to an end destination. Again, as long as packet order is preserved within each data flow, any load-balancing technique can be used, while still maintaining compliance with applicable standards such as IEEE standards.

The routed trunk comprising the links between the selected group 114 of ports 104 and server 112 now performs in the same manner as a conventional trunk. Server 112 need not perform routed trunking, and indeed needs no knowledge of the routed trunking. To server 112, the routed trunk appears the same as a conventional layer-2 trunk. The techniques described above can be used to establish additional routed trunks to server 112 or to other servers. Because these techniques are implemented using layer-3 mechanisms, the maximum number of trunks that multi-layer switch 100 can provide is limited only by the size of the routing table, which can be very large, rather than by the silicon area of switch 100, as is the case in conventional layer-2 trunking.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks.

Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A network device comprising:
   a plurality of ports configured to transmit and receive packets of data;
   a memory configured to store a routing table;
   a forwarding engine configured to transfer the packets of data between the plurality of ports based on the routing table; and
   a processor configured to
      adaptively select a group of the plurality of ports, wherein the group of the plurality of ports includes more than one of the plurality of ports and fewer than all of the plurality of ports,
      define a routing interface that aggregates the group of the plurality of ports into a dedicated routed trunk from the network device to a second network device,
      disable layer-2 link aggregation for each port of the group of the plurality of ports,
      assign a single media access control (MAC) address to the routing interface, and
      modify the routing table to direct each data flow having the single MAC address as a destination address to the second network device via a respective port of the routing interface.

2. The network device of claim 1, wherein the processor is further configured to disable bridging between the ports in the routing interface without disabling the ports in the routing interface.

3. The network device of claim 1, wherein the network device comprises a router.

4. The network device of claim 1, wherein the processor modifies the routing table to provide load balancing among the ports in the routing interface.

5. The network device of claim 4, wherein the load balancing is based on Equal Cost Multi-Path Routing Protocol (ECMP).

6. A method for transmitting and receiving packets of data through a plurality of ports of a network device, the method comprising:
   storing a routing table in memory of the network device;
   adaptively selecting a group of the plurality of ports, wherein the group of the plurality of ports includes more than one of the plurality of ports and fewer than all of the plurality of ports;
   defining a routing interface that aggregates the group of the plurality of ports into a dedicated routed trunk from the network device to a second network device;
   disabling layer-2 link aggregation for each port of the group of the plurality of ports;
   assigning a single media access control (MAC) address to the routing interface; and
   modifying the routing table to direct each data flow having the single MAC address as a destination address to the second network device via a respective port of the routing interface.

7. The method of claim 6, further comprising disabling bridging between the ports in the routing interface without disabling the ports in the routing interface.

8. The method of claim 6, wherein the network device comprises a router.

9. The method of claim 6, wherein modifying the routing table comprises modifying the routing table to provide load balancing among the ports in the routing interface.

10. The method of claim 9, wherein the load balancing is based on Equal Cost Multi-Path Routing Protocol (ECMP).

11. A computer program product, tangibly stored on a non-transitory computer-readable medium, for transmitting and receiving packets of data through a plurality of ports of a network device, the computer program product comprising instructions for causing a programmable processor to:
    store a routing table in memory;
    adaptively select a group of the plurality of ports, wherein the group of the plurality of ports includes more than one of the plurality of ports and fewer than all of the plurality of ports;
    define a routing interface that aggregates the group of the plurality of ports into a dedicated routed trunk from the network device to a second network device;
    disable layer-2 link aggregation for each port of the group of the plurality of ports;
    assign a single media access control (MAC) address to the routing interface; and
    modify the routing table to direct each packet of data having the single MAC address as a destination address to the second network device via a respective port of the routing interface.

12. The computer program product of claim 11, further comprising instructions for causing the programmable processor to disable bridging between the ports in the routing interface without disabling the ports in the routing interface.

13. The computer program product of claim 11, wherein the network device comprises a router.

14. The computer program product of claim 11, wherein the instructions to modify the routing table comprise instructions to modify the routing table to provide load balancing among the ports in the routing interface.

15. The computer program product of claim 14, wherein the load balancing is based on Equal Cost Multi-Path Routing Protocol (ECMP).

* * * * *

UNITED STATES PATENT AND TRADEMARK OFFICE
CERTIFICATE OF CORRECTION

PATENT NO. : 8,085,778 B1  
APPLICATION NO. : 12/581512  
DATED : December 27, 2011  
INVENTOR(S) : Yuval Cohen et al.

Page 1 of 1

It is certified that error appears in the above-identified patent and that said Letters Patent is hereby corrected as shown below:

Title Page, Item (54) and in the Specification, column 1, line 1, change Title from "VOLTAGE REGULATOR" to "LINK AGGREGATION FOR ROUTED PORTS"

Signed and Sealed this  
Tenth Day of December, 2013

Margaret A. Focarino  
*Commissioner for Patents of the United States Patent and Trademark Office*